United States Patent [19]
Bohan, Jr. et al.

[11] Patent Number: 5,340,019

[45] Date of Patent: Aug. 23, 1994

[54] ELECTRONIC AQUASTAT IN IMMERSIBLE CAPSULE

[75] Inventors: John E. Bohan, Jr., Edina; Frank S. Mills, Bloomington; Scott A. Ward, Golden Valley, all of Minn.

[73] Assignee: Honeywell Inc., Minneapolis, Minn.

[21] Appl. No.: 86,270

[22] Filed: Jun. 30, 1993

[51] Int. Cl.$^5$ .............................................. G01K 1/00
[52] U.S. Cl. .............................. 236/20 R; 236/68 D; 374/183; 374/208
[58] Field of Search ................ 236/91 G, 20 R, 68 D; 374/208, 158, 179, 183

[56] References Cited

U.S. PATENT DOCUMENTS

| | | | |
|---|---|---|---|
| 4,718,776 | 1/1988 | Gilland et al. | 374/208 X |
| 4,987,579 | 1/1991 | Yoshinaka et al. | 374/208 X |
| 5,008,775 | 4/1991 | Schindler et al. | 374/208 X |

Primary Examiner—William E. Wayner
Attorney, Agent, or Firm—Charles L. Rubow

[57] ABSTRACT

A liquid immersible electronic aquastat in which a temperature responsive element and substantially all associated electronic circuitry are arranged on a circuit board within a tubular capsule of liquid impervious material closed at one end and having a external diameter not exceeding ⅜ths of an inch so as to be interchangeable with industry standard aquastat temperature sensor mounting hardware and fittings.

5 Claims, 2 Drawing Sheets

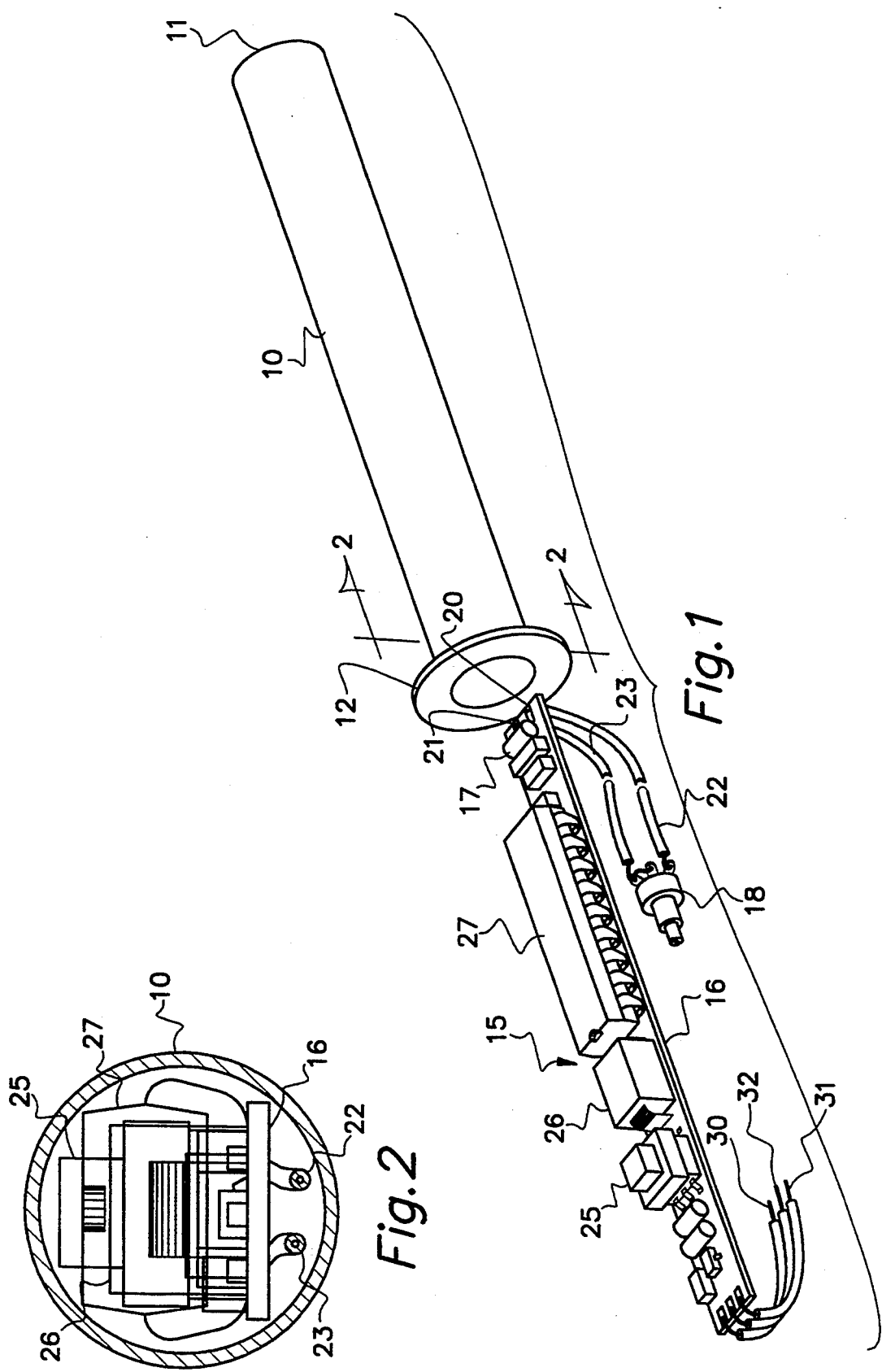

ELECTRONIC AQUASTAT IN IMMERSIBLE CAPSULE

BACKGROUND OF THE INVENTION

The present invention relates generally to apparatus for controlling energization of an electrical load in response to liquid temperature, and, more specifically, to an electronic implementation of such apparatus in which the liquid temperature sensing element and all electronic circuitry, except for a manually adjustable temperature setpoint control device, if any, are contained within a liquid impervious capsule.

Boilers, storage tanks, recreational and therapeutic hot tubs, and a variety of other equipment containing water or other liquid whose temperature must be controlled typically require a thermostatic control device or aquastat responsive to temperature of the liquid to achieve the necessary control function. The most common form of aquastat comprises a sealed bulb connected through a capillary tube to a chamber partially bounded by a diaphragm which serves as an electromechanical switch actuator, the bulb, capillary tube and diaphragm chamber being filled with a liquid having desired thermal expansion properties. The switch is typically used to control electrical energization to a fuel valve, such as a gas valve, a water or steam vane, or other desired load.

Such aquastat construction is well known, and certain industry standards regarding form, fit and function have been adopted. This is particularly true for the temperature sensing bulb which extends into the tank, pressure vessel or plumbing. Specifically, the bulb may be located in a well which provides integrity of the liquid container against leakage, in which case the bulb must fit snugly within the well to provide good thermal conductivity. Alternatively, the bulb may cooperate with a compression fitting or other suitable fitting in a port in the container to provide integrity against leakage. In either arrangement, industry standard hardware is designed for a bulb having specific dimensions. The most common standard bulb diameter is ⅜ths of an inch.

Although the design of such aquastats and related production equipment and methods have been refined over many years, and are well developed, such aquastats have several inherent shortcomings partially attributable to the mechanical nature of the design and the requirement for several manual operations associated with filling and sealing the bulb-capillary tube-diaphragm chamber system. Such shortcomings include unit-to-unit variations in the nominal control point of the manufactured devices. As a result, the control temperature for a particular application may not fall within the range of temperatures to which the aquastat can be calibrated. This results in a relatively high production rejection rate which contributes to unit cost. An additional contributor to cost of the design is its requirement for high content of various metals.

A further shortcoming stems from the requirement that the bulb and the switch apparatus must be connected by a capillary tube. Thus, there is a practical limit to the spacing between the bulb and switch apparatus, and unless the aquastat is specially manufactured for a particular installation, arrangements must be made for accommodating the excess length of capillary tube.

Finally, the diaphragm actuator and electrical switch are relatively large, and typically separated from the sensing bulb location, thereby resulting in limitations in the design of equipment incorporating an aquastat, and complicating aquastat installation.

Electronic aquastats have been proposed to overcome some of the previously noted shortcomings of conventional aquastat design. In an electronic aquastat, the liquid filled temperature sensing bulb is replaced by a thermistor or other device whose electrical characteristics vary with temperature. The thermistor is contained in a capsule having dimensions which are compatible with the mounting hardware for traditional liquid filled bulb temperature sensors. The thermistor is connected by means of a pair of leads to an electronic circuit typically fabricated on a circuit board and contained in a housing to be mounted at a separate location. Such a design offers greater flexibility than the previous designs, in that the connecting electrical leads may be substantially any desired length and require less care in handling and routing than a liquid filled capillary tube. Further, the electronic implementation is potentially less expensive, is adapted to more automated to manufacturing processes, and is smaller, thus providing greater equipment design and aquastat installation flexibility. The electronic implementation design is also inherently more accurate, thus providing for improved production yields, as well as performance benefits.

Although the proposed electronically implemented aquastat design offers various advantages, it concurrently introduces certain complications. Also, there remain areas in the design in which further improvements are desired.

One complication arises from the nature of a common system in which an aquastat is used. In particular, such a system employs an electrically operated fuel gas valve which is energized from a thermoelectric generator powered from the heat of a standing pilot flame. The electric power output of the generator is very low, and a special low power consuming gas valve system is required for use therewith. Such a gas valve system is commercially available from Honeywell Inc., with the generator being marketed under the tradename "Powerpile".

A conventional aquastat can be readily incorporated into such a system since it consumes substantially no electric power. Conversely, an electronic aquastat does consume electric power, and because electric power in a thermoelectric generator based system is limited, the electronic circuitry must be designed for very low power consumption. A circuit suitable for use in such an application is shown and described in detail in U.S. Pat. Nos. 4,696,369 and 4,734,658 issued on Sep.1987, and Mar. 29, 1988, respectively, and assigned to the assignee of the present application.

One feature of the proposed electronic aquastat in which further improvement is desired relates to cost. At the present state of development, the proposed electronic aquastat is somewhat more costly to produce than a traditional aquastat based on a liquid filled bulb sensor. A feature which contributes to cost and manufacturing complexity is a requirement for sealing at least portions of the electronics against the effects of moisture. This is an important requirement particularly in hot tub and certain other applications in which high humidity or otherwise moist conditions exist. Also, in many applications, it is necessary to provide electromagnetic shielding, which imposes a further requirement on the housing or packaging for the electronics.

Finally, the proposed electronic aquastat design involves two separate components, each of which must be individually accommodated in the equipment design and the installation process. Obviously, the equipment design and installation process would be simplified with an aquastat incorporated into a single package.

SUMMARY OF THE INVENTION

The invention is a liquid immersible electronic aquastat in which both the sensor element and associated electronic circuitry are contained within a single tubular capsule having the same size and shape as a standard liquid filled bulb used in traditional aquastats. The sensor and electronic circuitry are carried on an elongated circuit board dimensioned to fit within the capsule. A manually adjustable temperature set point control device accessible from outside the capsule may be provided. The setpoint control device, which may be a potentiometer, can be mounted at any convenient location and connected to the electronic circuitry through a pair of electrical conductors.

Accordingly, the applicants have provided an electronic aquastat design which overcomes the disadvantages of prior aquastat designs. In particular, the present aquastat is smaller, potentially cheaper and simpler to manufacture. Since it is essentially incorporated into a single package, design flexibility of equipment into which it is incorporated is enhanced, installation is simplified and installation cost is minimized. Finally, since essentially the entire aquastat is contained within a sealed capsule, which is typically formed of copper, any requirements for a special moisture barrier and/or electromagnetic shielding are eliminated.

BRIEF DESCRIPTION OF THE DRAWINGS

FIG. 1 is an exploded view of an electronic aquastat in accordance with the applicants' invention;

FIG. 2 is a cross-sectional view of the assembled electronic aquastat of FIG. 1 taken along lines 2—2 in FIG. 1.

DESCRIPTION OF THE PREFERRED EMBODIMENT

Figure 3:
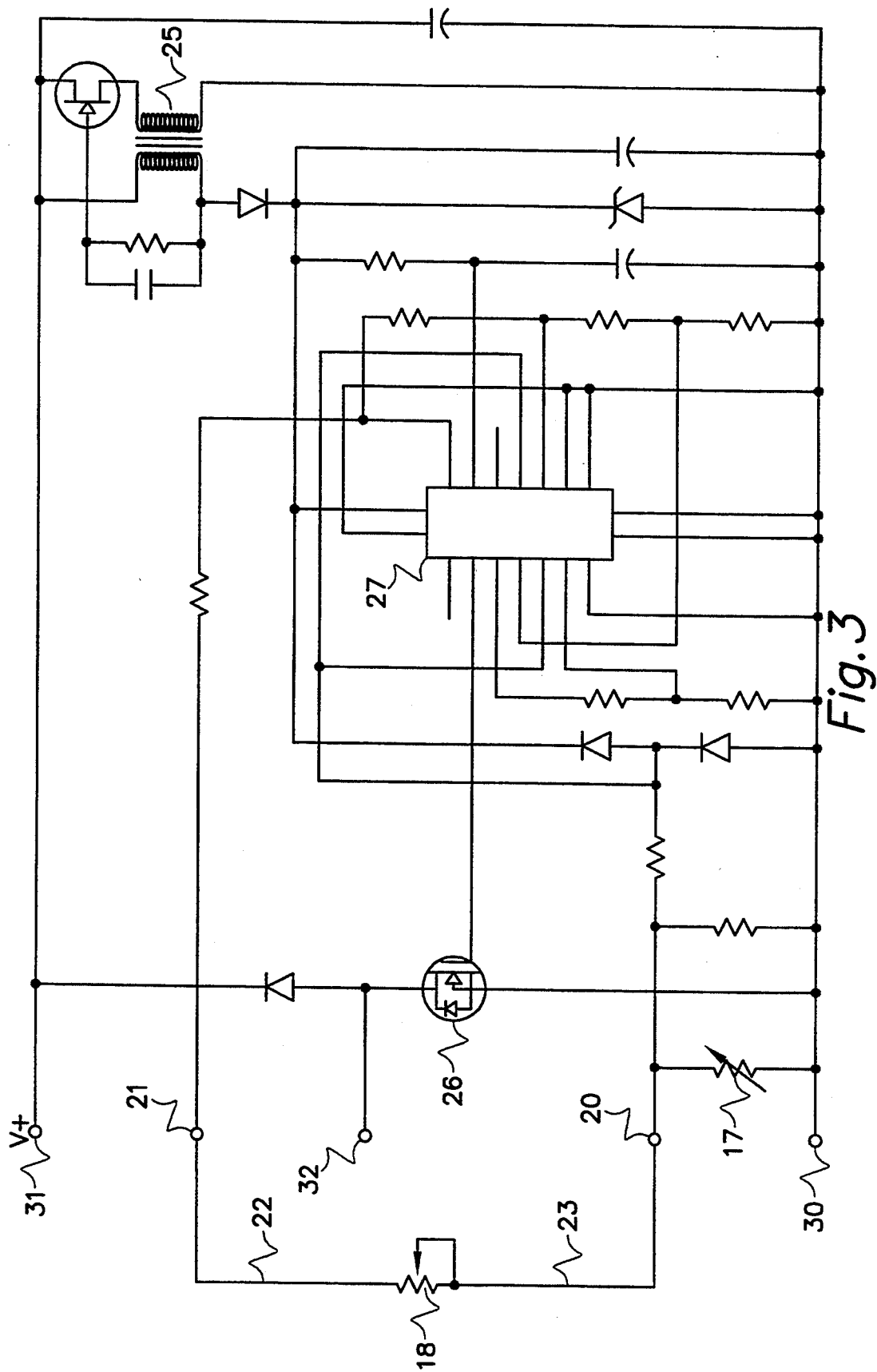
FIG. 3 is a schematic diagram of an electronic circuit usable in the electronic aquastat of FIGS. 1 and 2.

In the exploded view of FIG. 1, reference numeral 10 identifies a tubular capsule having a closed end 11 formed of a liquid impervious material, such as copper or stainless steel. The end of capsule 10 opposite closed end 11 may be formed with a mounting flange 12. Capsule 10 is designed to have the same dimensions and configuration as the immersion bulb of a traditional liquid filled temperature sensor. In particular, capsule 10 may have an outer diameter of ⅜ inch to be compatible with standard immersion wells and fittings used in conventional boiler, water heater, and hot tub equipment.

Reference numeral 15 generally identifies an electronic circuit including switching means operable to control the supply of electric current to a load in response to a temperature sensed by a temperature sensing element and a temperature setpoint set by a manually adjustable temperature setpoint control device. The electronic circuitry is shown formed and/or mounted on an elongated ceramic circuit board 16, circuit board 16 and the components mounted thereon being dimensioned to fit within capsule 10. A somewhat modified version of the circuit of previously identified U.S. Pat. Nos. 4,696,369 and 4,734,658, as shown in FIG. 3 of the present application, has been found to provide suitable electrical performance. The applicants have discovered that through careful layout and expeditions use of miniaturizing techniques, this circuit can be feasibly arranged to fit within the described capsule. This arrangement provides numerous advantages in terms of potentially low cost in both materials and manufacturing processes, improvements in environmental protection and electromagnetic shielding, and elimination of a separate electronics package with its required housing which interferes with flexibility in equipment design and increases installation costs.

Returning to the physical circuit arrangement shown in FIG. 1, reference numeral 17 identifies a thermistor or other suitable element whose electrical characteristics vary with temperature. Reference numeral 18 identifies a potentiometer which can be manually adjusted to a desired temperature setpoint for the liquid surrounding capsule 10 in an intended application. Good thermal conductivity between thermistor 17 and capsule 10 may be provided by filling at least the closed end of capsule 10 with grease having good thermal conductivity and/or by other known expedients.

The wiper terminal and at least one end terminal of the resistance element in potentiometer 18 are connected to pads 20 and 21 on circuit board 16 through conductors 22 and 23 respectively. With circuit board 16 positioned within capsule 10, leads 22 and 23 pass beneath circuit board 16, as shown in FIG. 2, and out the open end of capsule 10. This arrangement permits potentiometer 18 to be mounted at any convenient location to provide great flexibility in the location of the manual temperature setpoint control and in the design of the equipment into which the aquastat is incorporated.

Other major components mounted on circuit board 16 include a transformer 25, an electronic switch 26 and an integrated circuit 27. In addition, various discrete diodes, transistors, and capacitors are mounted on circuit board 16 and connected through conductors and resistors formed on the circuit board by thick film screening processes.

Transformer 25 is part of a voltage converter circuit for increasing the voltage of about 0.75 volts DC supplied by the thermoelectric generator to 12 volts DC suitable for powering the remaining electronic circuitry. In particular, electrical energy is alternately transferred between the inductive storage provided by transformer 25 and capacitive storage provided by capacitors in the circuit through a transistor therein to provide an oscillating voltage which can be stepped up by the transformer. The higher AC voltage is then rectified to provide 12 volts DC.

Integrated circuit 27 is a CMOS device, and requires exceedingly limited electrical power for its operation. An integrated circuit suitable for this application is an LTC 1040 "Bang-bang Controller" available from Linear Technology. As used in the present circuitry, integrated circuit 27, among other functions, provides a sample-and-hold function relative to the sensed and setpoint temperatures.

As previously indicated, the low power consumption permits the circuitry to be powered from a thermoelectric generator. In the arrangement shown on FIG. 1, electrical power from the thermoelectric generator is supplied to circuit 15 through electrical leads 30 and 31, of which lead 30 may be considered a common lead for both electrical circuit 15 and a load, such as a gas valve connected to circuit 15 through a load lead 32. Load lead 32 is connected to a switched terminal of electronic switch 26.

The cross-sectional view of FIG. 2 illustrates the aquastat of FIG. 1 with circuit 15 in place within capsule 10. Circuit 15 may be fixed in place within capsule 10 and effectively hermetically sealed from the environment by filling the capsule with potting compound or otherwise providing a sealing plug or other known expedient at the open end of the capsule.

In the circuit diagram of FIG. 3, electrical elements and features shown in FIGS. 1 and 2 are identified by like reference numerals as used in FIGS. 1 and 2. For a more complete understanding of the arrangement and operation of this circuit, reference may be made to previously identified U.S. Pat. Nos. 4,696,639 and 4,734,658.

In accordance with the foregoing description, the applicants have provided a unique liquid immersible electronic aquastat design. Although a particular embodiment has been shown and described for illustrative purposes, numerous modifications and variations which do not depart from the applicants' contemplation and teaching will be apparent to those of ordinary skill in the relevant arts. Coverage is not intended to be limited to the embodiment shown, but only by the terms of the following claims.

The embodiments of the invention in which an exclusive property or right is claimed are defined as follows:

1. Liquid immersible electronic temperature responsive apparatus, comprising:
   A tubular capsule of liquid impervious material closed at one end and having predetermined internal and external diameters;
   and elongated circuit board dimensioned to fit within said tubular capsule;
   a sensor element having a temperature responsive electrical characteristic carried on said elongated circuit board;
   an electronic circuit arranged on said elongated circuit board and electrically connected to said sensor element, said electronic circuit including switching means operable to control supply of electric current to a load in response to the temperature sensed by said sensor element; and
   means retaining said circuit board in said capsule.

2. The electronic temperature responsive apparatus of claim 1 wherein:
   a manually adjustable temperature setpoint control device accessible from outside said tubular capsule is provided; and
   said electronic circuit is operable to control supply of electric current to the load in response to the temperature sensed by said sensor element and the temperature setpoint established by said temperature setpoint control device.

3. The electronic temperature responsive apparatus of claim 2 wherein the predetermined external diameter of said tubular capsule is substantially ⅜ inch.

4. The electronic temperature responsive apparatus of claim 3 wherein said electronic circuit is capable of operating on very low voltage direct current electrical power, said electronic circuit including an oscillator energizable from very low voltage direct current electrical power, a voltage step-up transformer having a primary winding connected to said oscillator, rectifier means connected to the secondary winding of said transformer, and sample and hold means operable to periodically sense the electrical characteristics of said sensor element and said temperature setpoint control device, and to control the state of the switching means in response to the sensed electrical characteristics.

5. The electronic temperature responsive apparatus of claim 4 wherein said manually adjustable temperature setpoint control device is a potentiometer connected to said electronic circuit through electrical leads to permit installation of the potentiometer remote from the remainder of said electronic temperature responsive apparatus.

* * * * *